United States Patent [19]
Hirai et al.

[11] Patent Number: 5,888,361
[45] Date of Patent: Mar. 30, 1999

[54] APPARATUS FOR PRODUCING HYDROGEN AND OXYGEN

[75] Inventors: Kiyoshi Hirai; Shinichi Yasui, both of Kakogawa; Hiroko Kobayashi, Kobe; Teruyuki Morioka, Kakogawa; Akiko Miyake, Kobe; Hiroyuki Harada, Tokyo, all of Japan

[73] Assignee: Shinko Pantec Co., Ltd., Hyogo, Japan

[21] Appl. No.: 850,280

[22] Filed: May 5, 1997

[30] Foreign Application Priority Data

| May 8, 1996 | [JP] | Japan | 8-113458 |
| May 27, 1996 | [JP] | Japan | 8-131480 |

[51] Int. Cl.⁶ ............... C25B 9/00; C25B 15/02
[52] U.S. Cl. .......... 204/262; 204/266; 204/274; 204/278; 118/429
[58] Field of Search .......... 204/256–258, 204/241, 260, 262, 239; 118/429

[56] References Cited

U.S. PATENT DOCUMENTS

| 4,891,116 | 1/1990 | Stritzke | 204/274 X |
| 5,082,544 | 1/1992 | Willey et al. | 204/270 |
| 5,401,371 | 3/1995 | Oshima et al. | 204/258 |
| 5,632,870 | 5/1997 | Kucherov | 204/262 X |
| 5,690,797 | 11/1997 | Harada et al. | 204/239 X |

FOREIGN PATENT DOCUMENTS

| 2051859 | 3/1992 | Canada | C25B 1/12 |
| 0 478 980A1 | 4/1992 | European Pat. Off. | C25B 1/12 |
| 573088 | 6/1924 | France . | |
| 2410058 | 6/1979 | France | C25B 9/00 |
| 8239786 A | 9/1996 | Japan . | |
| WO 91/07525 | 5/1991 | WIPO | C25B 9/00 |

*Primary Examiner*—Donald R. Valentine
*Attorney, Agent, or Firm*—Marshall, O'Toole, Gerstein, Murray & Borun

[57] ABSTRACT

A simply configured cooling mechanism for an apparatus for producing hydrogen and oxygen is disclosed. The configuration makes it possible to freely select the type of heat exchanger, without any restrictions, in order to improve cooling efficiency. In particular, a heat exchanger for cooling deionized water in a deionized water tank, which contains an electrolytic cell, is installed outside the tank. An inlet to the heat exchanger is connected to a deionized water flow outlet from the tank that is below the level of the deionized water the tank by a pipe, and an outlet from the heat exchanger to tank is connected to a deionized water flow inlet that is positioned in the tank below the deionized water flow outlet.

13 Claims, 12 Drawing Sheets

APPARATUS FOR PRODUCING HYDROGEN AND OXYGEN

FIELD OF THE INVENTION

The present invention relates to an apparatus for producing hydrogen and oxygen of high purity (hereinafter referred to as "HHOG"). In particular, the present invention relates to an HHOG which electrolyzes deionized water to produce hydrogen gas and oxygen gas of high purity, and is capable of cooling deionized water in a tank that contains an electrolytic cell.

DISCLOSURE OF THE RELATED ART

As shown in FIG. 10, a high pressure-type apparatus for producing hydrogen and oxygen of high purity 51 (hereinafter referred to as "HHOG") generally comprises a tank 53 (hereinafter referred to as "deionized water tank") for generating hydrogen and oxygen in which a cell 52 (hereinafter referred to as "electrolytic cell") for electrolyzing deionized water is contained, a deionized water feeding tank 54 for feeding deionized water W to deionized water tank 53, and a gas-liquid separation tank 55 for hydrogen gas which removes moisture from hydrogen gas ($H_2$). In the diagram, numeral 56 denotes a deionized water feeding pump. Inside electrolytic cell 52, in deionized water tank 53, deionized water present inside electrolytic cell 52 is electrolyzed to generate hydrogen gas $H_2$ and oxygen gas $O_2$. The generated oxygen gas $O_2$ passes directly through the deionized water in deionized water tank 53, then is collected through an oxygen gas discharging pipe 57. On the other hand, the generated hydrogen gas $H_2$ is not passed through the deionized water in deionized water tank 53. The hydrogen gas $H_2$ is directed from electrolytic cell 52 through a hydrogen gas discharging pipe 58 into a gas-liquid separation tank 55 for hydrogen gas in which moisture is removed. Then, the hydrogen gas $H_2$ is collected.

The above-mentioned electrolytic cell 52 is column-shaped, and the construction thereof is shown in FIG. 11 and FIG. 12. FIG. 11 shows electrolytic cell 52 after assembly, and FIG. 12 shows the electrolytic cell 52 before assembly. Electrolytic cell 52 comprises a plurality of electrolyte membrane units stacked together. Each electrolyte membrane unit is provided with an electrode plate 61 and ring-shaped gaskets 64 at both sides thereof, respectively. A space closed by above-mentioned members 61, 62, 64 on one side of an electrolyte membrane 62 forms an anode chamber, and a space closed by above-mentioned members 61, 62, 64 on the other side of electrolyte membrane 62 forms a cathode chamber. The anode chamber and the cathode chamber are provided with a porous conductor 64, respectively. Each electrode plate 61, except both end electrode plates, of electrolytic cell 52 is a bipolar-type electrode plate, which is a single electrode plate having opposing surfaces that have opposite polarity when energized. Numeral 65 identifies a protective sheet. Numeral 66 identifies a hydrogen gas discharging path, and 66a identifies a hydrogen gas discharging duct. Numeral 67 identifies an oxygen gas discharging path, and 67a identifies an oxygen gas discharging duct. Numerals 68a and 68b identify end plates. The diagram does not illustrate a deionized water feeding path, but it has a configuration similar to that of hydrogen gas discharging path 66.

As shown in FIG. 11, the above-mentioned elements are clamped between end plates 68a, 68b by bolts 69 to form electrolytic cell 52.

The electrolytic cell 52 shown in FIG. 10 is arranged horizontally (the central axis of the electrolytic cell is virtually horizontal), but vertically arranged electrolytic cells exist.

Normally, the temperature of the deionized water in the above-mentioned deionized water tank rises due to heat generation at the time of electrolysis. This is not desirable from the viewpoint of preventing thermal degradation of the parts, and the like, of electrolytic cell 52. Moreover, a rise in temperature of the deionized water results in an increase in water vapor in deionized water tank 53, and in turn, in an increase in the moisture content of the generated oxygen gas. As a result, the dehumidification load increases. Moreover, a high temperature of deionized water tank 53 is not desirable for the workers working in the vicinity of the apparatus.

Hence, according to the prior art, a heat exchanger 59 for controlling the temperature rise of deionized water is installed in deionized water tank 53 of a high pressure-type HHOG as shown in FIG. 10 to cool the deionized water. It, therefore, is necessary to circulate a coolant, from the exterior of deionized water tank 53, through heat exchanger 59. Hence, pipes 60a, 60b for passing a coolant are installed from a coolant supply source (not illustrated) to heat exchanger 59; the pipes penetrate the shell wall of deionized water tank 53. Pipe 60a, on the external side of the heat exchanger 59, is provided with a pump 60c for supplying a coolant.

It is a general practice to limit the volume of the above-mentioned deionized water tank 53 to one that is sufficient to store electrolytic cell 52 and contain the necessary volume of deionized water for electrolysis. The reason is that using a larger volume than necessary for generating hydrogen and oxygen reduces the economic efficiency. Hence, the size of heat exchanger 59 must be reduced. Moreover, if heat exchanger 59 is installed above electrolytic cell 52, bubbles of oxygen gas generated from electrolytic cell 52 will adhere to the surface of the heat exchanger and lower the efficiency of the heat exchanger. It, therefore, is inevitable that heat exchanger 59 is installed on one side of electrolytic cell 52, namely, in the gap between electrolytic cell 52 and the inner surface of the wall of deionized water tank 53.

A deionized water tank of double shell type wherein a coolant jacket is formed over the outer circumference of a deionized water tank can be used. However, as the internal pressure of the tank is close to 10 kg/cm$^2$, the production cost of a high pressure tank of the double shell type is significantly higher. Moreover, because the high pressure tank requires a larger wall thickness for the deionized water tank, heat exchanging efficiency is decreased.

In HHOG 51 configured as described above, heat exchanger 59 is necessarily installed on a side of electrolytic cell 52 inside deionized water tank 53. Hence, the size of heat exchanger 59 is limited. In other words, to install heat exchanger 59 on one side of electrolytic cell 52, it is necessary to increase the volume of deionized water tank 53. Moreover, when heat exchanger 59 is installed on one side of electrolytic cell 52, it is difficult to achieve an effective natural convection of deionized water that accompanies cooling.

SUMMARY OF THE INVENTION

The present invention solves the above-mentioned problems and provides an HHOG having a cooling mechanism for effectively cooling deionized water in a deionized water tank. According to the present invention, a heat exchanger is installed outside a deionized water tank. The heat exchanger is connected to the deionized water tank by means of piping to configure a system wherein no special pump is required, and deionized water is circulated by natural convection through a loop that comprises the deionized water tank having a heat generating source and the heat exchanger having a cooling source. Moreover, because the heat exchanger is installed on the external side, i.e., outside, the deionized water tank, it is possible to make the deionized water tank lighter and more compact, and to select the type of heat exchanger according to the prevailing service conditions and installation conditions.

By forming an electrolytic cell in a cylindrical shape, a heat exchanger can be arranged in the center cavity of the electrolytic cell, thus, the volume of the deionized water tank can be smaller. Furthermore, natural convection of the deionized water is effectively achieved, thereby the cooling efficiency can be improved.

The HHOG of the present invention is an apparatus for producing hydrogen and oxygen having a deionized water tank that contains an electrolytic cell; characterized in that a heat exchanger for cooling deionized water in the deionized water tank is installed outside the deionized water tank, an inlet to the heat exchanger is connected to a first position on the tank that is below the level of the deionized water in the deionized water tank, and an outlet from the heat exchanger is connected to a second position on the tank that is below the first position in the tank.

Hence, the deionized water naturally circulates due to the natural convection through a loop that comprises the heat exchanger, the deionized water tank, and the means for connecting the heat exchanger and the deionized water tank (such as piping). The deionized water in the deionized water tank is heated and moves upward, and the deionized water in the heat exchanger is cooled and moves downward. Hence, the deionized water in the deionized water tank flows from the first position of the deionized water tank into the heat exchanger, and the deionized water in the heat exchanger flows from the second position of the deionized water tank into the deionized water tank.

As explained above, no pump is required to cause the circulation of the deionized water. Because the liquid to be circulated is deionized water having an extremely low viscosity, the deionized water naturally circulates satisfactorily. If forced circulation of the deionized water is needed, an optional pump can be provided. For example, the apparatus can be an HHOG characterized in that a heat exchanger for cooling deionized water in the deionized water tank is installed outside the deionized water tank, an inlet to the heat exchanger is connected to a first position that is below the level of the deionized water in the tank, and a piping is provided from an outlet of the heat exchanger to the cell and penetrating the wall of the tank for feeding the cell with cooled and deionized water.

Further, because the heat exchanger is installed outside the tank, the deionized water tank can be made lighter and more compact than a conventional tank. Thus, production costs can be reduced, and handling for transport and installation is easier. Moreover, in contrast to the prior art, the size, configuration, type, etc., of the heat exchanger are not limited by the volume of the tank. A variety of different types of heat exchanger can be used according to the service conditions of the HHOG, the facilities of a plant where the HHOG is installed, the installation area, etc. The type of heat exchanger is not limited, for example, a plate-type heat exchanger and a shell-and-tube-type heat exchanger having a variety of tube shapes are mainly used.

In cases of an HHOG wherein the above-mentioned heat exchanger is disconnectably mounted on the tank, the heat exchanger can be integrally mounted on the tank in advance together with piping for connecting up with the tank. Hence, the heat exchanger and the tank can be transported as an integral unit, which contributes to a reduction in cost. When this cooling mechanism is installed, the heat exchanger and the tank can be installed as an integral unit, and there is no need to pipe the tank and the heat exchanger at the installation site. This also will contribute to reduction in cost. Moreover, because assembly is executed at a factory of the producer, a variety of tests, such as a leakage test, pressure test, or tightness test, that have been made at the installation sites in the past, can be made efficiently at the factory of the manufacturer. This is naturally preferable.

An apparatus for producing hydrogen and oxygen provided with a cylindrical electrolytic cell of the present invention is an electrolytic cell having an anode chamber and a cathode chamber that are separated by a solid electrolyte membrane being an electrolyte membrane and are placed between electrode plates, and a deionized water tank that contains said electrolytic cell, characterized in that both the above-mentioned anode chamber and cathode chamber are formed as annular compartments being isolated on their inner circumferences and on their outer circumferences from the outside, and the entire electrolytic cell is cylindrical with a cavity at the center thereof, and that a heat exchanger for cooling the deionized water in the deionized water tank is arranged in the central cavity of the electrolytic cell.

With the above-mentioned configuration, it is possible to install a heat exchanger in the central cavity of a cylindrical electrolytic cell, and to make the deionized water tank more compact. Moreover, deionized water that is cooled by the heat exchanger descends in the above-mentioned central cavity and then rises through a gap between the outer circumference of the electrolytic cell and the internal surface of the wall of the deionized water tank. In short, a very effective path is formed for natural convection of the deionized water.

When the above-mentioned cylindrical electrolytic cell is provided with ring-shaped end plates on both ends, and both the end plates are clamped together to hold the components of the anode chamber and the cathode chamber between them by using a plurality of clamping means on the inner circumference side and the outer circumference side of the anode chamber and the cathode chamber, restraining portions of the electrolytic cell are formed on the outer circumference side and the inner circumference side thereof. Hence, the rigidity of the electrolytic cell is enhanced. A variety of known means can be used for the above-mentioned clamping means. Of these means, bolts and nuts are easy to obtain and assemble; thus, an increase in costs can be avoided.

It is preferred that the above-mentioned cylindrical electrolytic cell is provided with a ring-shaped electrolyte membrane, ring-shaped porous conductors provided on both the sides of the membrane, ring-shaped electrode plates provided on the outer sides of both the porous conductors, an outer side closing member provided on the outer circumference side of the porous conductors, and an inner side closing member provided on the inner circumference side of the porous conductors. Then, the cell can be entirely configured into a compact form. Gaskets can be used for the above-mentioned outer side and inner side closing members. With respect to materials of construction of the gaskets, those wherein the main component is a silicone resin are preferred because their sealing capabilities are excellent.

It is preferred to stack a plurality of electrolytic cells described above to form an electrolytic module, because such construction makes the deionized water tank compact and the construction is able to generate large volume of gases.

When the deionized water tank is installed vertically (i.e., the tank is installed in such a way that its central axis is essentially vertical), as described above, the deionized water that is cooled by the heat exchanger descends in the central cavity of the electrolytic cell, and the deionized water that is heated by the electrolytic cell rises through the gap between the outer circumference of the electrolytic cell and the internal surface of the wall of the deionized water tank. This natural convection can effectively cool the entire volume of deionized water. In this case, if the oxygen gas discharge path of the electrolytic cell is opened on the outer circumference side of the electrolytic cell, the oxygen gas rises in the deionized water on the outer circumference side of the electrolytic cell, and the resulting entrained flow of the deionized water accelerates the ascent of the heated deionized water. Thus, a more effective convection of deionized water is achieved. It is more preferred that the central axis of the central cavity of the cylindrical electrolytic cell is arranged to align with the central axis of the deionized water tank.

It is preferred to configure the above-mentioned deionized water with a tank shell and a tank cover, and disconnectably mount the above-mentioned electrolytic cell on the interior surface of the tank cover in such a way that when the above-mentioned tank cover is fitted into the tank shell, the electrolytic cell is inside the tank shell. This arrangement makes it easier to install the electrolytic cell in the deionized water tank. Similarly, in the deionized water tank, it is preferable to disconnectably install the above-mentioned heat exchanger on the interior surface of the tank cover, because this facilitates disassembly and installation of the heat exchanger.

It should be noted that the term "cylindrical" used in the claims means not only circular cylindrical, but also prismatic, oval cylindrical, elliptic cylindrical, etc. The term "annular form" used in the claims means not only circular annular form but also multi-angular annular form, oral annular form, elliptic annular form, etc. Moreover, the word "ring-shaped" means not only circular ring-shaped, but also multi-angular ring-shaped, oval ring-shaped, elliptic ring-shaped, etc.

DETAILED DESCRIPTION OF THE INVENTION

With reference to embodiments shown in the attached drawings, an HHOG of the present invention is described.

Figure 1:
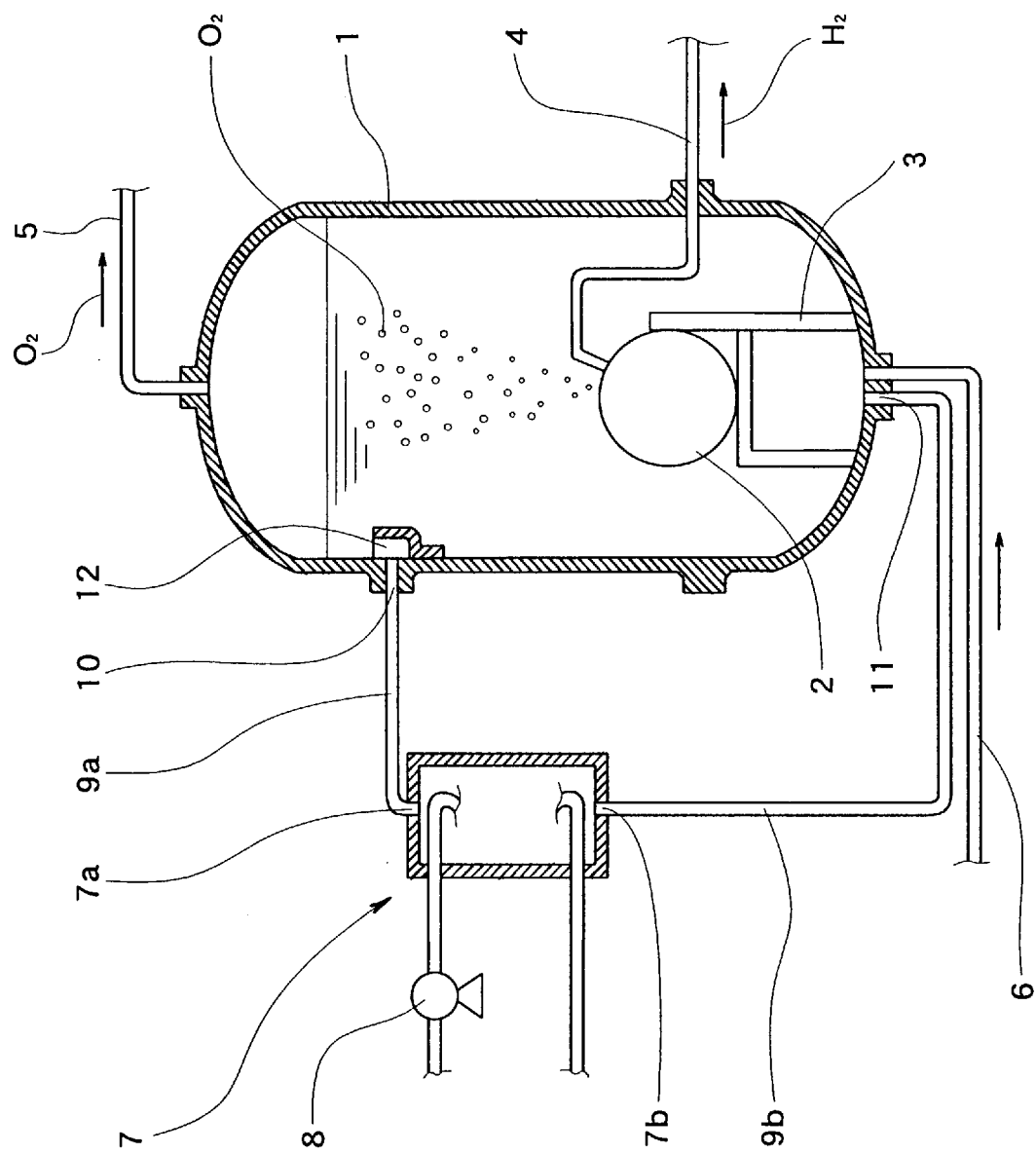
FIG. 1 is a sectional view showing one embodiment of the HHOG according to the present invention.

In FIG. 1, numeral 1 denotes a deionized water tank (hereinafter referred to as "tank"), wherein an electrolytic cell 2 is mounted on a support 3 in tank 1. A hydrogen gas discharging pipe 4 for guiding out the generated hydrogen gas extends from electrolytic cell 2, through a wall of tank 1, to a liquid-gas separation tank (not illustrated) for hydrogen gas. Numeral 5 denotes an oxygen gas discharging pipe.

Numeral 7 denotes a well known plate-type heat exchanger. Numeral 8 denotes a coolant supply pump that supplies a coolant from a coolant supply source (not illustrated) to heat exchanger 7. Cold water, freon, etc., are used as the coolant.

An inlet 7a of a heat exchanger 7, being the inlet for deionized water to be cooled, is connected to a deionized water flow outlet 10 of tank 1 by a pipe 9a. An outlet 7b from heat exchanger 7, being the outlet for the cooled deionized water, is connected to a deionized water flow inlet 11 of tank 1 by a pipe 9b. Pipes 9a, 9b are disconnectably joined with flanges (not illustrated).

The above-mentioned deionized water flow outlet 10 is formed above the deionized water flow inlet 11 in tank 1, and during the operation of the HHOG, the level of deionized water in tank 1 is maintained above deionized water outlet 10. As will be described later, this is necessary for cooling the deionized water by natural circulation.

With the configuration described above, the deionized water in the tank, being heated by electrolytic cell 2 or a heat source, rises in the tank, and on the other hand, the deionized water that is cooled in the heat exchanger descends in the heat exchanger. This natural convection generates natural circulation of the deionized water in a loop comprising tank 1, heat exchanger 7 and pipes 9a, 9b.

Regarding the position, on a horizontal plane, of inlet 11 for the cooled deionized water relative to that of electrolytic cell 2 being the heat source, it is preferable to arrange them in essentially the same position on a horizontal plane or to position deionized water flow inlet 11 beneath electrically the same position on a horizontal plane or to position deionized water flow inlet 11 beneath electrolytic cell 2 as shown in FIG. 1 through FIG. 5, such that the rise in temperature of the deionized water in the tank can be controlled efficiently. The reason is that the cooled deionized water can be directly fed into electrolytic cell 2.

To prevent against an emergency, or to prevent the generated oxygen gas rising in the form of bubbles from flowing into deionized water flow outlet 10, and, in turn, into heat exchanger 7, a cover 12 for preventing inflow of oxygen gas can be installed, as shown in the diagram, from the lower side of deionized water flow outlet 10. Cover 12 covers the lower portion and the sides of deionized water flow outlet 10 on the interior of the tank. The configuration of this cover is essentially a vertically halved hemisphere. By using a cover 12 of such configuration, the deionized water flows downward inside cover 12 in the direction of deionized water flow outlet 10. On the other hand, the oxygen gas bubbles move upwardly due to buoyancy. Hence, the oxygen gas bubbles are not entrained by the flow of deionized water. Thus, the oxygen gas bubbles cannot flow into heat exchanger 7. The configuration of cover 12 is not particularly defined. It is sufficient that the configuration of cover 12 can prevent rising oxygen gas bubbles from passing near deionized water outlet 10.

Figure 2:
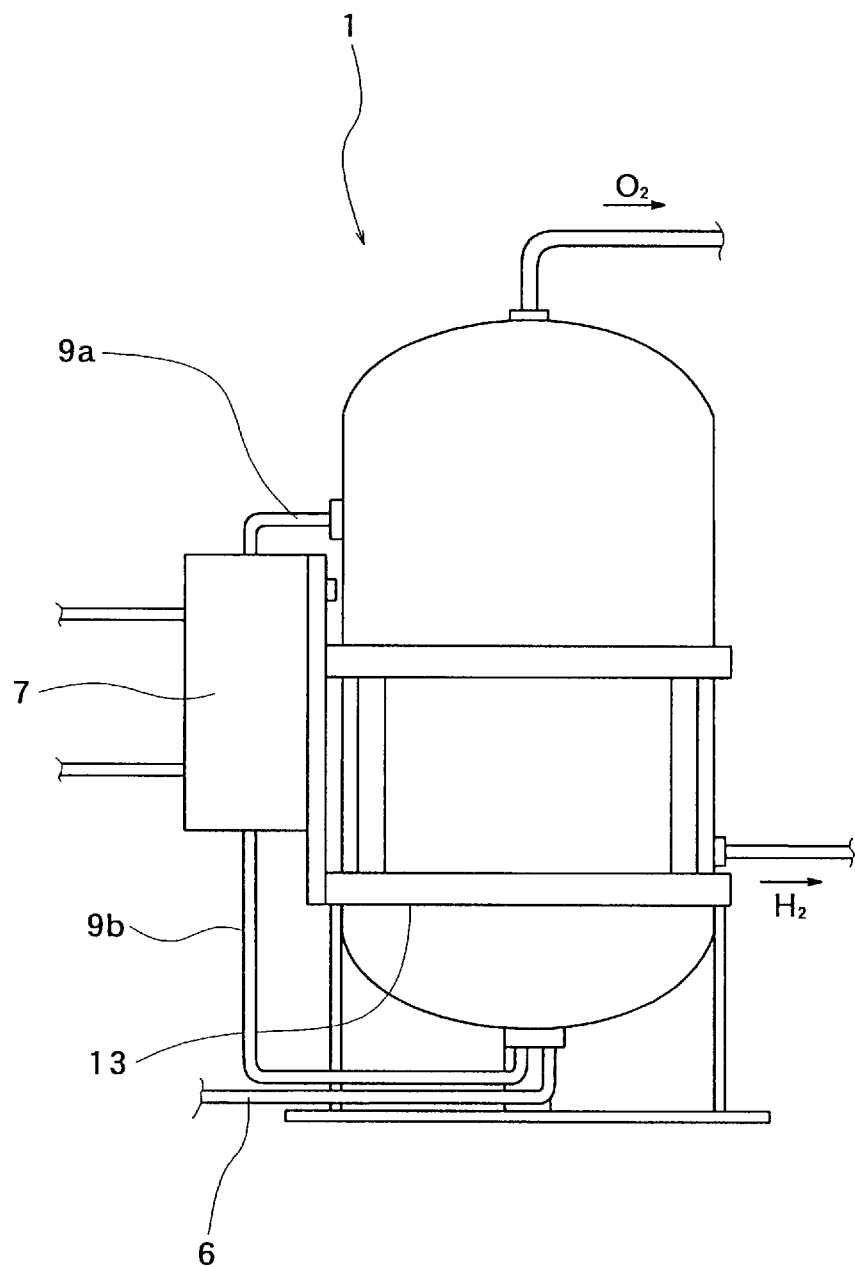
FIG. 2 is a partial sectional front view showing another embodiment of the HHOG according to the present invention.

The cooling mechanism shown in FIG. 2 uses the same principle of cooling deionized water as the cooling mechanism of FIG. 1, but the above-described heat exchanger 7 is mounted directly on the tank 1 to provide an integrated unit.

In the present embodiment, heat exchanger 7 is disconnectably mounted on a stand 13 of tank 1 by means of bolts (not illustrated). The pipes 9a, 9b are disconnectably joined with flanges (not illustrated).

With the above-mentioned arrangement, the support for tank 1 can be used as support 13 of heat exchanger 7, and it is not necessary to install another support for the heat exchanger 7. Furthermore, the lengths of pipes 9a, 9b can be reduced. This in turn makes the apparatus more compact.

According to the present invention, integration of tank 1 and heat exchanger 7 is not limited to an embodiment with a stand. For example, if heat exchanger 7 is light in weight, it can be supported by above-described pipes 9a, 9b, alone.

Tank 1 is used at high pressure, and to prevent leakage of deionized water from tank 1, it is desirable to reduce the number of ports for piping in tank 1. From this viewpoint, in the cooling mechanism shown in FIG. 3, pipe 9b for directing deionized water from heat exchanger 7 into tank 1, and deionized water feeding pipe 6, are connected to each other such that the two flows of deionized water in the direction of tank 1 are joined together. Furthermore, a check valve 15 is provided on pipe 9b between heat exchanger 7 and a junction point 14, such that the two ports for piping present in FIG. 1 can be reduced to one. With this configuration, the number of ports for piping can be reduced, and in turn, the sealing and the safety of tank 1 are improved. Moreover, when deionized water is fed by a feeding pump (not illustrated) through deionized water feeding pipe 6, the cooled deionized water from heat exchanger 7 can be forced into tank 1.

The provision of check valve 15 prevents the cooled deionized water from flowing back into heat exchanger 7.

Figure 3:
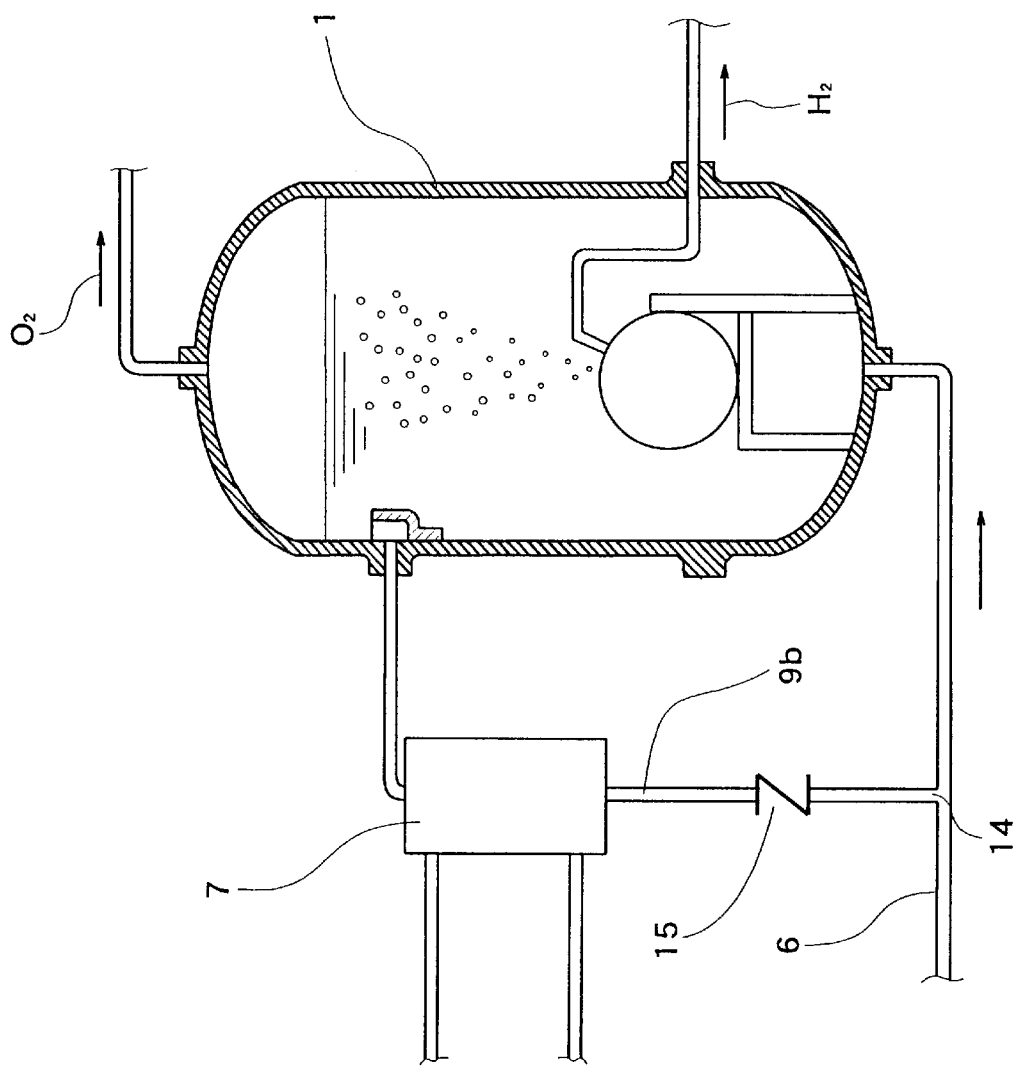
FIG. 3 is a sectional view showing another embodiment of the HHOG according to the present invention.
Figure 4:
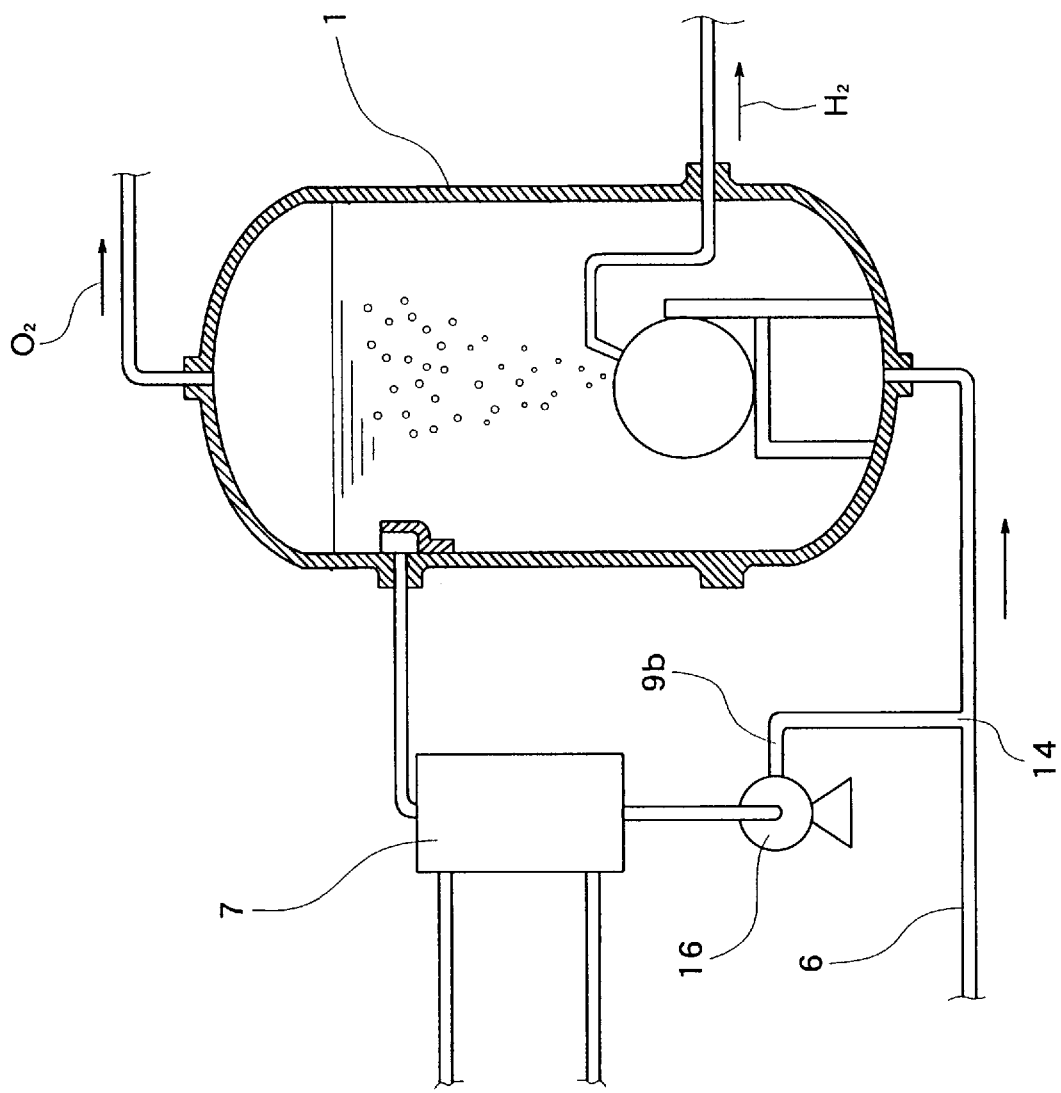
FIG. 4 is a sectional view showing another embodiment of the HHOG according to the present invention.

In the cooling mechanism shown in FIG. 4, like the mechanism shown in FIG. 3, pipe 9b for directing deionized water from heat exchanger 7 into tank 1, and deionized water feeding pipe 6, are connected to each other. However, the cooling mechanism of FIG. 4 differs from that of FIG. 3 in that a pump 16 is provided on the above-mentioned pipe 9b between heat exchanger 7 and junction point 14. With this configuration, the piping can be simplified, and moreover, deionized water cooled by heat exchanger 7 can be forced into tank 1. As a result, the deionized water in the tank is agitated and the cooling effect in tank 1 is enhanced.

Figure 5:
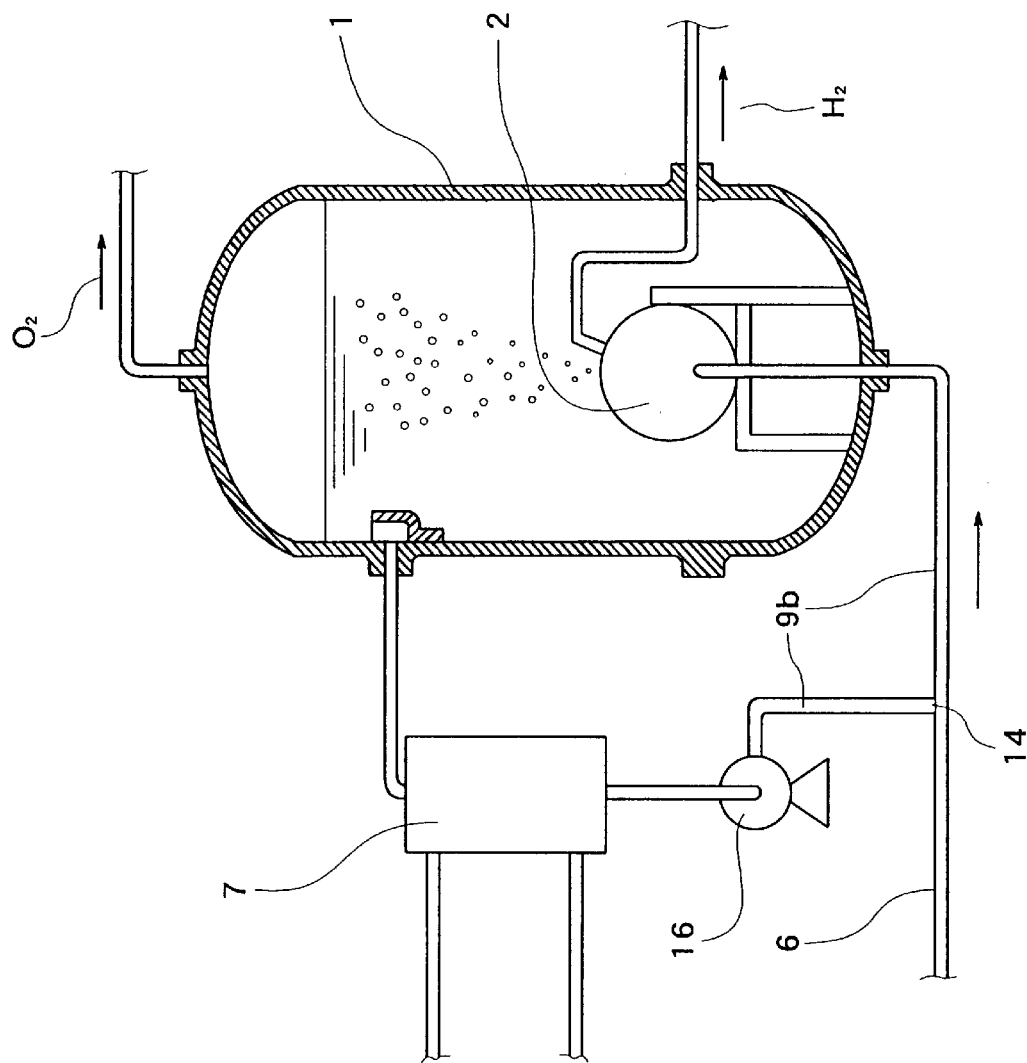
FIG. 5 is a sectional view showing another embodiment of the HHOG according to the present invention.

In the cooling mechanism shown in FIG. 5, like the mechanism shown in FIG. 4, pipe 9b for directing deionized water from heat exchanger 7 into tank 1, and deionized water feeding pipe 6, are connected to each other, and pump 16 is provided on above-mentioned pipe 9b between heat exchanger 7 and junction point 14. However, the above-mentioned pipe 9b is not merely connected to tank 1, but penetrates the wall of tank 1, is extended into tank 1, and is directly connected to electrolytic cell 2. In other words, the arrangement is such that the cooled deionized water can be fed directly to a deionized water feeding path (not illustrated) in electrolytic cell 2.

With this arrangement, the piping can be simplified, and moreover, electrolytic cell 2, being he heat source, can be cooled directly. As a result, thermal degradation of the parts of electrolytic cell 2, such as solid electrolyte membranes and gaskets (not illustrated) can be effectively prevented.

It should be noted that the configuration of directly connecting the above-mentioned pipe 9b to electrolytic cell 2 is not limited to the cooling mechanism shown in FIG. 5 and can be applicable to the cooling mechanisms shown in FIG. 1, FIG. 2, FIG. 3, and FIG. 4.

In the following, the cooling mechanism of the HHOG according to the present invention is described from the viewpoint of function by comparing the cooling efficiency of the cooling mechanisms described above to that of a conventional cooling mechanism.

Generally speaking, the heat transfer coefficient ($\alpha a$) of plate-type heat exchangers used in the above-mentioned embodiments is from 1000 to 3000 kcal/m$^2$/hr/°C. (the mean value is set at 2000 kcal/m$^2$/hr/°C.), and the heat transfer coefficient ($\alpha b$) of the coil tube-type heat exchangers used in the prior art is from 200 to 1000 kcal/m$^2$/hr/°C. (the mean value is set at 500 kcal/m$^2$/hr/°C.).

On the other hand, the heat generation (Q) of ordinary electrolytic cells used in the prior art and in the embodiments is 25,800 kcal/hr, which is calculated from the current of 600 A and the voltage of 50 V.

With regard to the cooling conditions, the cooling temperature of the deionized water to be cooled, or the drop in temperature ($\Delta t$), is set at 30° C., i.e., from 80° C. to 50° C. The rise in temperature of the coolant in the heat exchanger ($\Delta t$) is set at 5° C., i.e., from 32° C. to 37° C.

Then, the required heat transfer area (Aa) of the heat exchanger of the present embodiment (e.g., a plate-type heat exchanger is used) is given by $$Aa=Q/\alpha a \cdot \Delta tm=25,800 \text{ kcal/hr} \div 2000 \text{ kcal/m}^2/\text{hr}/°C. \div 28.7° C.=0.45 \text{ m}^2.$$

On the other hand, the required heat transfer area (Ab) of the heat exchanger of the prior art (e.g., a coil tube-type heat exchanger is useed) is given by $$Ab=Q/\alpha b \cdot \Delta tm=25,800 \text{ kcal/hr} \div 500 \text{ kcal/m}^2/\text{hr}/°C. \div 28.7° C.=1.8 \text{ m}^2.$$

As shown above, a heat exchanger having a heat transfer area about one-fourth (¼) of that of the prior art, in other words, a small-sized (thin) heat exchanger, can be used. Because such a small-sized and thin heat exchanger can be used, it is easy to integrate the heat exchanger with tank 1. Such a free selection of the type and size of heat exchanger is realized by the fact that, in contrast to the prior art, there is no need to install a heat exchanger in a space of limited configuration or in a space between the internal surface of the tank wall and the electrolytic cell. Moreover, to put it in another way, it is possible to improve the cooling efficiency significantly by using a heat exchanger of the plate type, and of a size similar to the heat exchanger of the prior art.

If the heat transfer area of the above-mentioned heat exchanger is assumed to be identical for both the prior art and the present embodiment, it is necessary to set the coolant flow rate and the flow rate of deionized water to be cooled of the prior art at about four (4) times of those of the present embodiment. Such a assumption is unrealistic.

As explained so far, the present HHOG can be light in weight and compact, and achieve a significant improvement in cooling efficiency.

Further, another type of HHOG with a efficient deionized water cooling mechanism is described hereinafter. The water cooling efficiency of said HHOG is highly improved by means of modifying an electrolytic cell of said HHOG, as shown in FIGS. 6 through 9.

Figure 6:
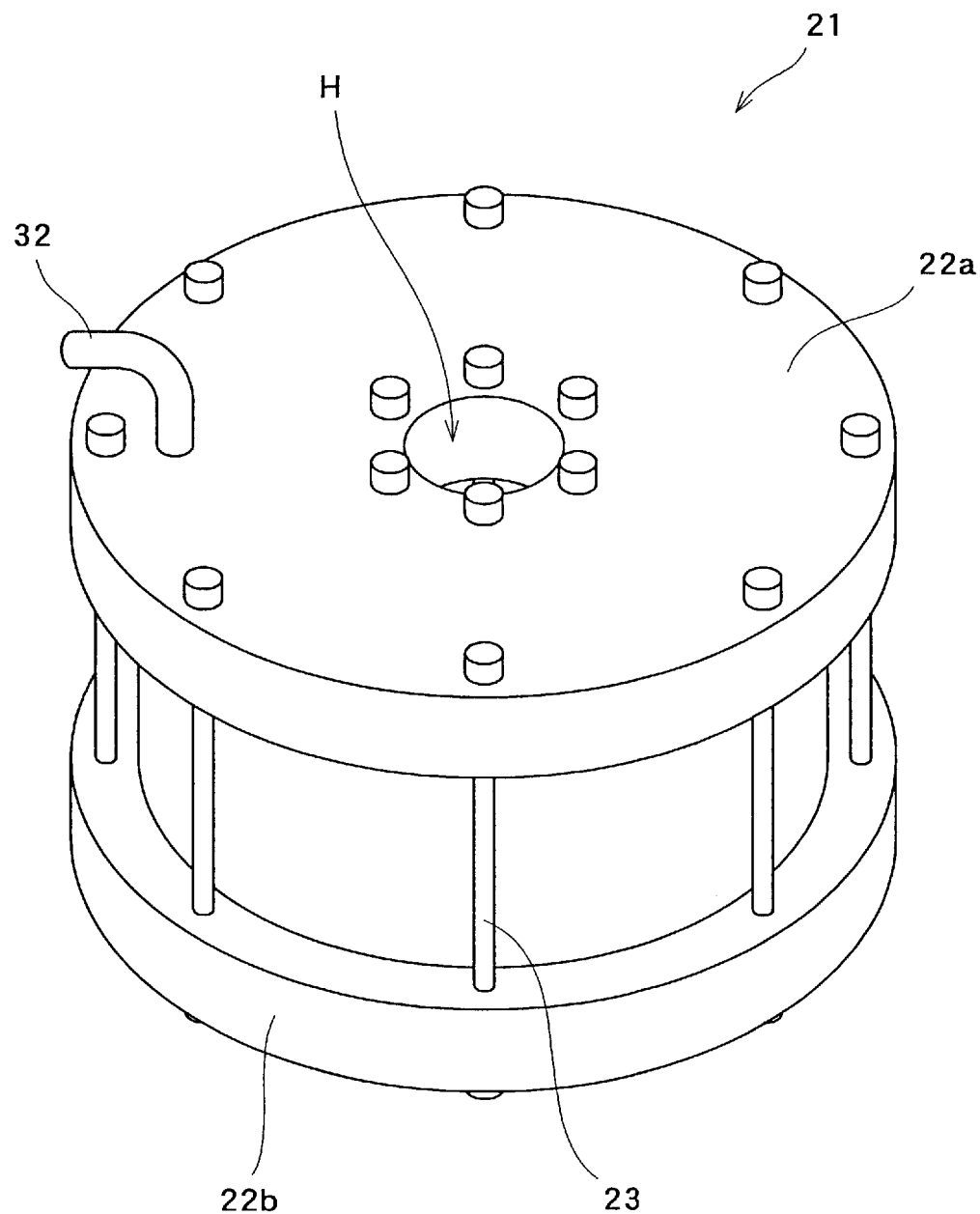
FIG. 6 is a perspective view showing a cylindrical electrolytic cell in the HHOG according to the present invention.
Figure 7:
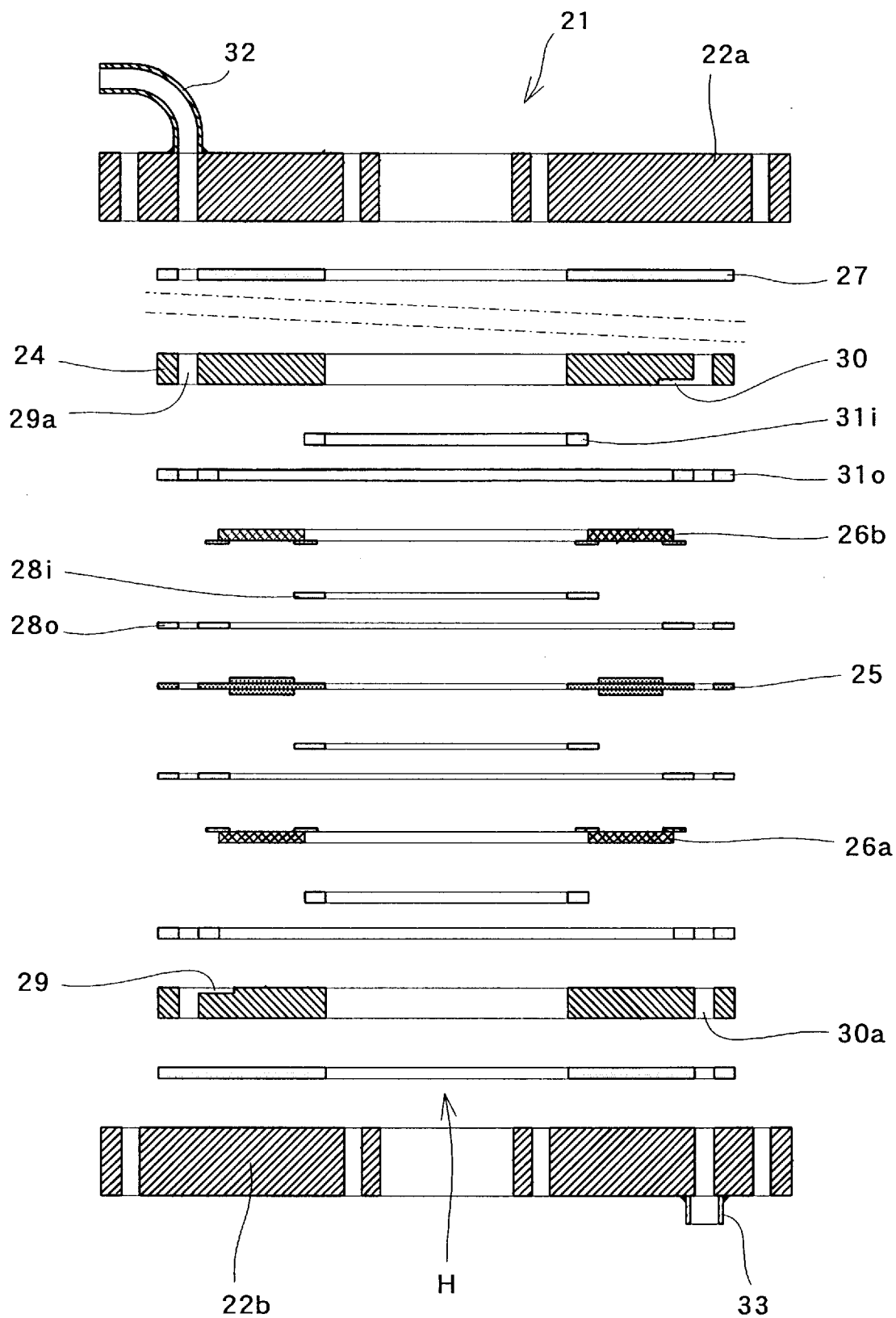
FIG. 7 is a sectional view showing the cylindrical electrolytic cell of FIG. 6 before assembly thereof.
Figure 8:
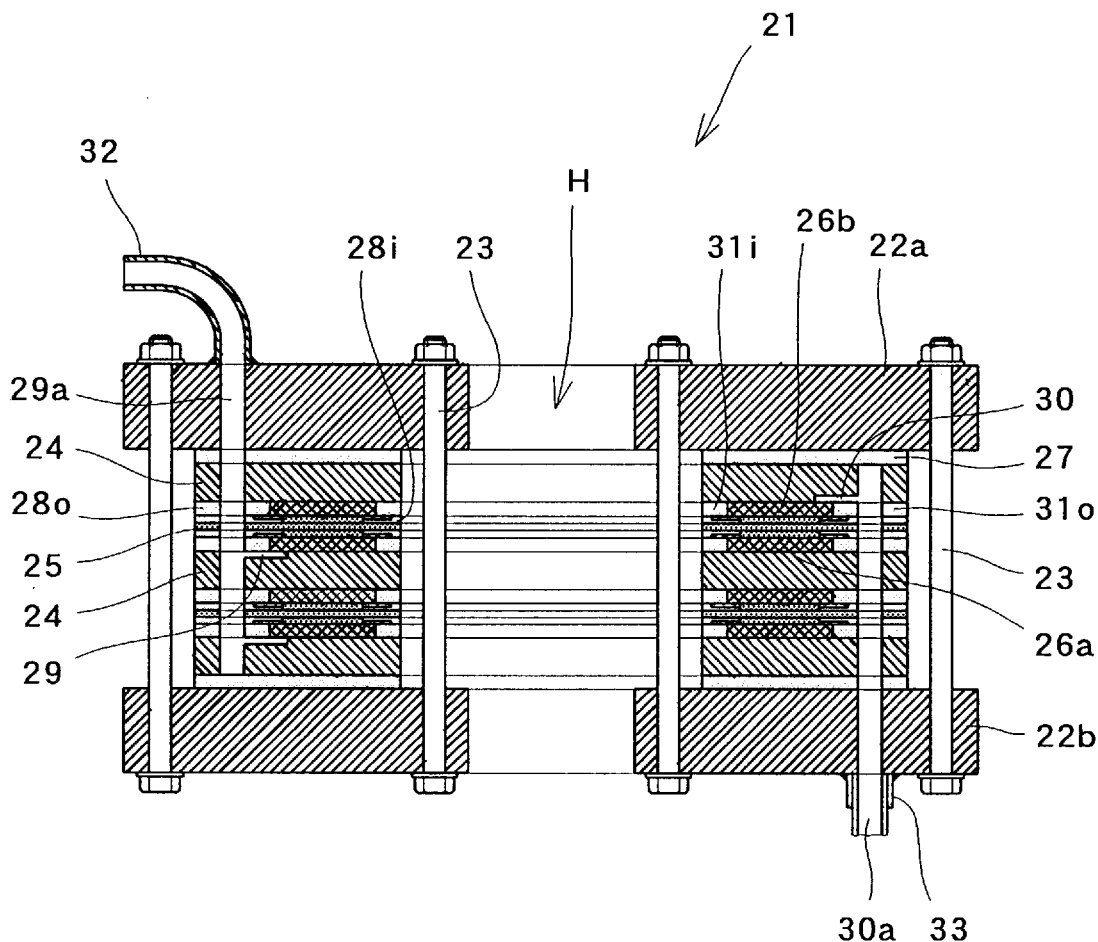
FIG. 8 is a sectional view showing the cylindrical electrolytic cell of FIG. 6 after assembly thereof.

A circular cylindrical electrolytic cell 21 is shown in FIG. 6 through 8. Numerals 22a and 22b denote end plates. The components of electrolytic cell 21 described below are held between end plates 22a, 22b by tightening bolts 23. A plurality of bolts 23 are tightened on the outside the outer circumference side, and on the outside the inner circumference side, of circular cylindrical electrolytic cell 21, respectively. As shown in FIG. 8, "the outside inner circumference" means the central-cavity-side of the outside of the inner circumference of the cell. Thus, as bolts are provided both on the outer circumference side and the inner circumference side, electrolytic cell 21 has a greater rigidity than conventional electrolytic cells. Furthermore, as the number of clamping bolts is increased, bolts of a smaller diameter can be used.

Numeral 24 denotes a circular ring-shaped electrode plate, and numeral 25 denotes a circular ring-shaped solid electrolyte membrane. Numerals 26a and 26b denote circular ring-shaped porous conductors, respectively. Numeral 27 denotes a circular ring-shaped end gasket, and numeral 28 denotes a circular ring-shaped protective sheet. Numeral 29 denotes an oxygen gas discharging path, and numeral 29a denotes an oxygen gas discharging duct. Numeral 30 denotes a hydrogen gas discharging path, and numeral 30a denotes a hydrogen gas discharging duct. The deionized water feeding path is not shown in the diagram, but it has a configuration similar to that of hydrogen gas discharging path 30.

Electrolytic cell 21 comprises a plurality of electrolytic cell units stacked together. Each electrolytic cell unit is provided with an anode chamber and a cathode chamber that are separated by electrolytic membrane 25, and located between electrode plates 24. Electrolytic cell units adjacent to each other have single electrode plate 24 for common use as a bipolar-type electrode plate. Therefore, an electrode plate 24 between electrolytic cell units adjacent to each other has opposing surfaces that have opposite polarity when energized.

Both the anode chamber and the cathode chamber are formed as annular compartments being isolated on their inner circumferences and on their outer circumferences from the outside with intermediate gaskets 31.

Intermediate gasket 31 isolates anode chamber 26a or cathode chamber 26b from the outside on the inner circumference side and on the outer circumference side. Intermediate gasket 31 consists of two members; a gasket 31i on the inner circumference side of electrolytic cell as an inner side closing member, and a gasket 31o on the outer circumference side thereof as an outer side closing member. A positive sheet 28 consists of two members; a sheet 28i on the inner circumference side of the electrolytic cell and a sheet 28o on the outer circumference side thereof. They are designed to make anode chamber 26a and the cathode chamber 26b in annular forms, respectively. The anode chamber and the cathode chamber are provided with porous conductors 26a, 26b, respectively. The above-mentioned oxygen gas discharging path 29 connects anode chamber 26a and oxygen gas duct 29a. The hydrogen gas discharging path 30 connects cathode chamber 26b and hydrogen gas duct 30a.

Preferably, titanium of a plate type is used as a material of electrode plates 24. As for porous conductors 26a, 26b, a mesh of titanium can be used.

An elbow 32 is provided on the top of upper end plate 22a and is connected to oxygen gas duct 29a. This is, as will be explained later, to guide the oxygen gas generated in electrolytic cell 21 out of the outer circumference of electrolytic cell 21. A nipple 33 is provided on the bottom of lower end plate 22b, and is connected to hydrogen gas duct 30a. This is, as will be explained later, to connect a hydrogen gas discharging pipe 45 that guides the hydrogen generated in electrolytic cell 21 out of a deionized water tank 41.

With the configuration described above, the present electrolytic cell 21 is formed into a circular cylinder having a cavity H in the center thereof.

In the above-mentioned embodiment, as shown in FIG. 6 through FIG. 8, an electrolytic cell having two solid electrolyte membranes has been described. The invention is not limited to such an embodiment, and any number of solid electrolyte membranes can be used to provide the required quantities of oxygen gas or hydrogen gas.

Figure 9:
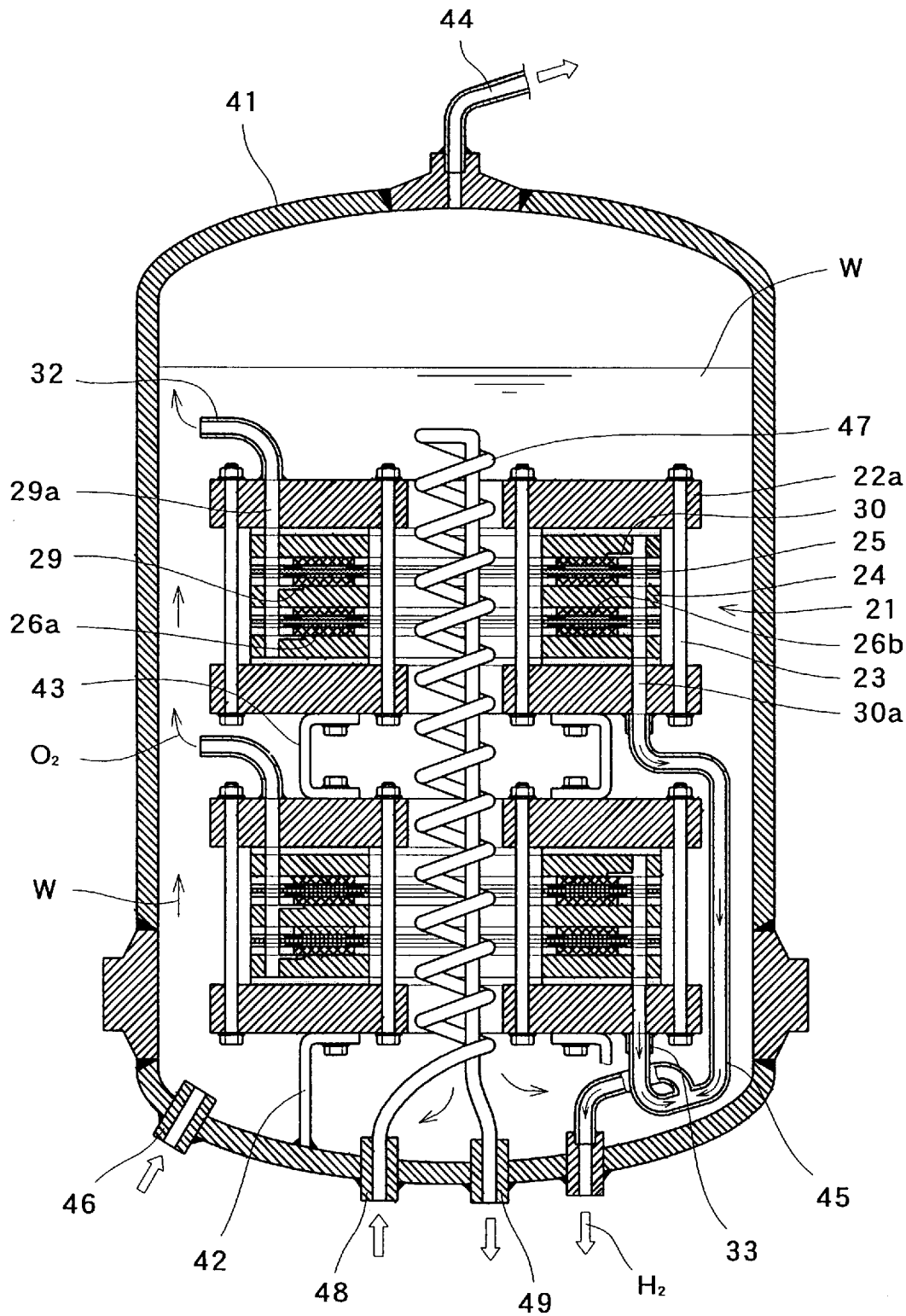
FIG. 9 is a sectional view showing one embodiment of a deionized water tank containing a cylindrical electrolytic cell of FIG. 6.
Figure 10:
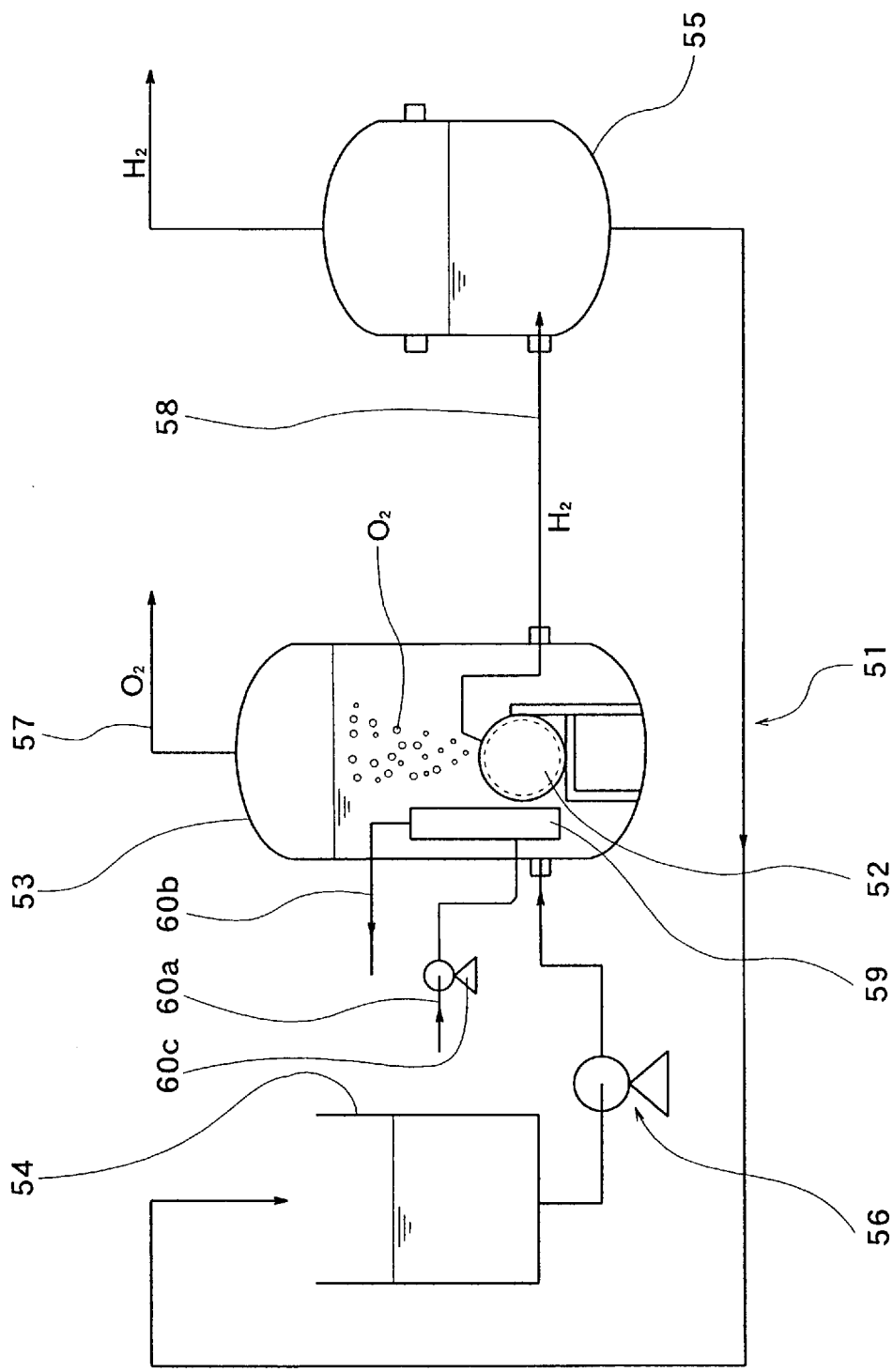
FIG. 10 is a diagram showing one example of HHOG having the conventional cooling mechanism.
Figure 11:
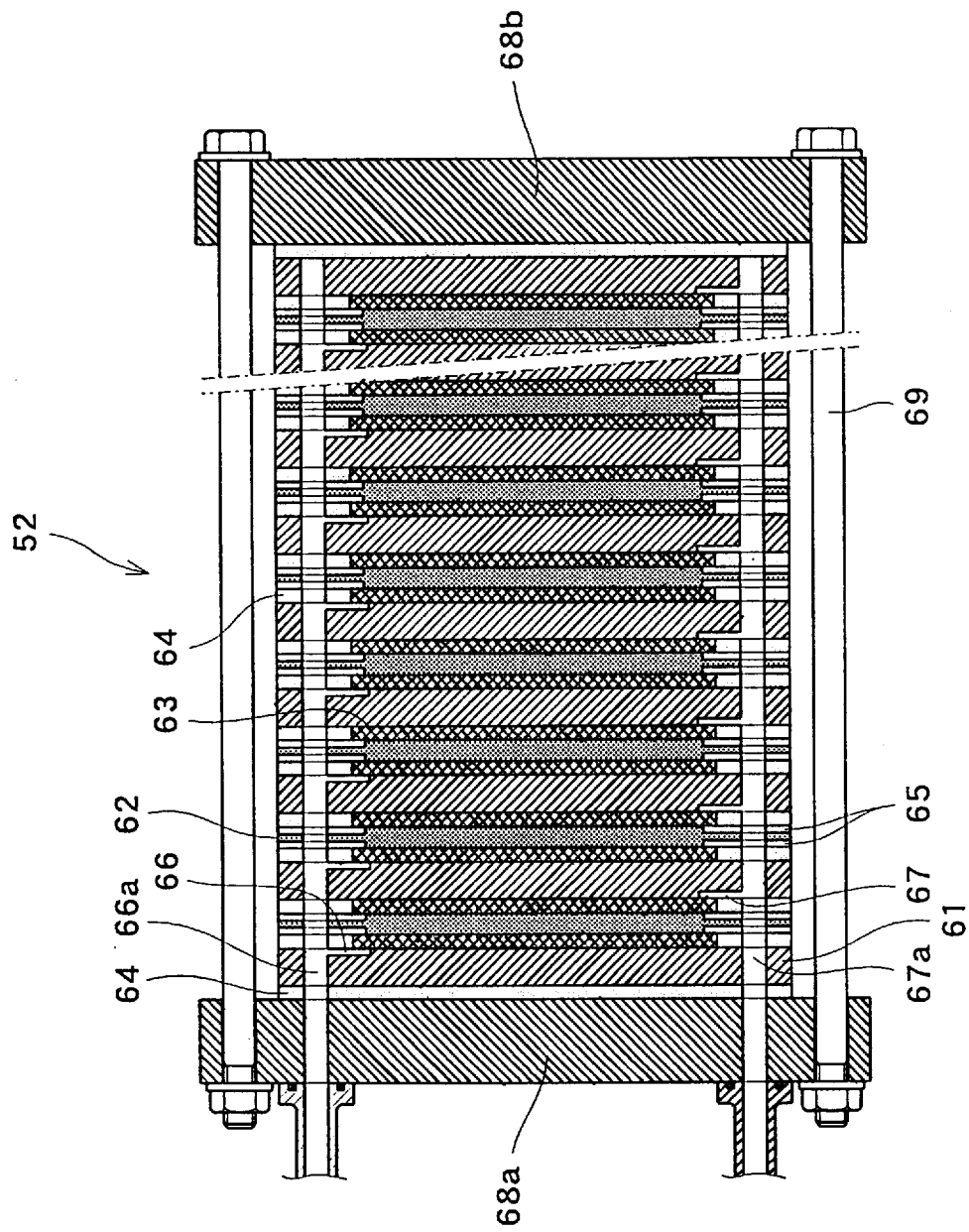
FIG. 11 is a sectional view of an example of the conventional electrolytic cell after assembly thereof.
Figure 12:
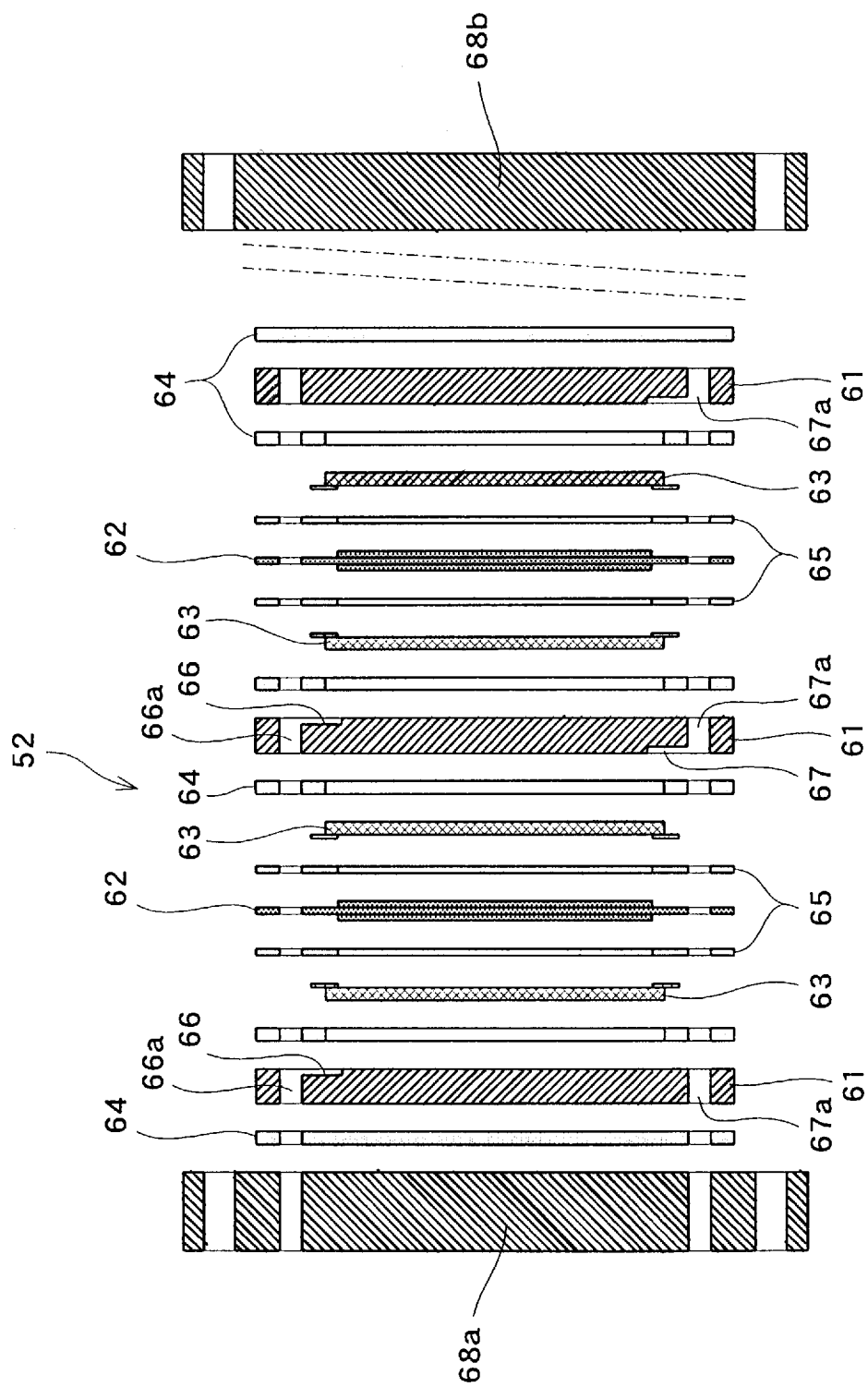
FIG. 12 is a sectional view of an example of the conventional electrolytic cell of FIG. 11 before assembly thereof.

FIG. 9 shows deionized water tank 41 in which the above-mentioned electrolytic cells 21 are provided in two stages. Deionized water tank 41 is a primary component of the HHOG. Deionized water W is stored in deionized water tank 41, and deionized water W is directed into electrolytic cell 21 and electrolyzed. Numeral 42 denotes a stand for fixing electrolytic cell 21 onto the bottom of deionized water tank 41. Numeral 43 denotes a connector that connects electrolytic cells 21 to each other.

Oxygen gas generated in electrolytic cell 21 is discharged out of the above-mentioned elbow 32 into the deionized water on the outer circumference side of electrolytic cell 21. Then, the oxygen gas is directed through an oxygen gas discharging pipe 44, which is connected onto the top of deionized water tank 41, and fed into a dehumidifier (not illustrated). The oxygen gas is collected after dehumidification.

On the other hand, hydrogen gas generated in electrolytic cell 21 is directed through hydrogen gas discharging pipe 45, which is connected to above-mentioned nipple 33 and penetrates the wall of deionized water tank 41, and is fed into a gas-liquid separator tank (not illustrated). Then, the hydrogen gas is directed to a dehumidifier (not illustrated). The hydrogen gas is collected after dehumidification. Numeral 46 denotes a deionized water feeding port to which a deionized water feeding pipe (not illustrated) is connected.

A tube-type heat exchanger 47 is installed in cavity H at the center of electrolytic cells 21. One end of heat exchanger 47 is connected to a coolant inlet 48 that is formed in the deionized water tank wall, and the other end is connected to a coolant outlet 49 that is formed in the deionized water tank wall. Cold water, freon, etc., are used as the coolant.

With the configuration described above, in deionized water tank 41, deionized water W that is cooled by heat exchanger 47 descends through cavity H at the center of electrolytic cells 21, and the deionized water W that is heated by electrolytic cells 21 rises, partly due to ascent of the generated oxygen gas, on the outer circumference side of electrolytic cell 21. Thus, an effective convection is generated to improve the cooling efficiency of the deionized water as a whole.

Moreover, in contrast to the prior art, the heat exchanger is not installed in the annular space outside the electrolytic cell, thus, the deionized water tank can be made more compact. Moreover, although not illustrated, the deionized water tank can be configured with two members, e.g., a shell and a head plate each having a flange, or with three members, e.g., a shell and two head plates each having a flange. These members can be formed such that they are joined by flange connections. In this way, the above-mentioned electrolytic cell 21 and/or the above-mentioned heat exchanger 47 can be installed in advance on the internal surface of one head plate. With such a configuration, disassembly and assembly of deionized water tank 41 is accomplished more easily.

With respect to the solid electrolyte membrane, a solid polymer electrolyte can be formed into a membrane, for example, a solid polymer electrolyte membrane, wherein a porous anode and a porous cathode, each of a precious metal, and particularly a metal of the platinum group, are bonded by chemical plating onto opposing faces of a cation exchange membrane, such as a cation exchange membrane made of fluorocarbon resin containing sulphonic acid groups, for example, NAFION 117, available from DuPont deNemours, Inc., Wilmington, Del. In this case, both electrodes preferably are made of platinum. In particular, when both electrodes are of a two-layer construction of platinum and iridium, it is possible to electrolyze using a high current density, for example, at 80° C. and 200 A/dm$^2$, for as long as about four years, whereas a conventional solid electrolyte membrane in which the electrodes are in physical contact with an ion exchange membrane can be electrolyzed at 50 to 70 A/dm$^2$. In this case, in addition to the above-mentioned iridium, it is possible to use a solid polymer electrolyte membrane of a multi-layer construction wherein two or more metals of the platinum group are plated. It is possible to achieve operation at a high current density by using above-mentioned membrane.

When a solid electrolyte membrane of the present application is constructed such that electrodes of a precious metal or metals are bonded by chemical plating onto opposing faces of solid polymer electrolyte, water is not present between the solid polymer electrolyte and either electrode. Hence, there is neither solution resistance nor gas resistance, and in turn, contact resistance between the solid polymer electrolyte and each electrode is low, the voltage is low, and current distribution is even. As a result, it is possible to use a higher current density and electrolyze water at a higher temperature and at a higher pressure, which results in production of high purity oxygen and hydrogen gases with a greater efficiency.

Other solid electrolyte membranes, such as a ceramic membrane, can be used instead of the solid polymer electrolyte membrane.

In the above-mentioned embodiment, the present invention was described as an example of an apparatus for producing hydrogen and oxygen of high purity, wherein electrolytic cells are installed in two stages. The invention is not limited to this embodiment, and can be applied to an apparatus wherein an electrolytic cell is installed in one stage or electrolytic cells are installed in three or more stages.

In the present embodiment, a vertical tank (i.e., the central axis of the tank is virtually vertical) is used by way of example. In the present invention, however, the tank is not limited to a vertical one, and a horizontal one (i.e., the central axis of the tank is essentially horizontal) can be used. With the use of a cooling mechanism of the present invention, deionized water can be cooled while it is made to circulate by natural convection. Hence, no special circulation apparatuses are required, and the resulting configuration is simple. Naturally, it is possible to install apparatuses for forced circulation (such as pumps). Moreover, because the heat exchanger is installed outside the tank, the tank can be made lighter in weight and more compact. This, in turn, reduces the production costs, transport costs, and installation work costs. The type of heat exchanger can be freely selected according to the service conditions and installation conditions. This, in turn, improves cooling efficiency.

With an HHOG of the present invention incorporating a cylindrical electrolytic cell, the heat exchanger can be installed in the central cavity of the cylindrical electrolytic cell, and the deionized water tank can be more compact. Moreover, a very suitable route is provided for the natural convection of deionized water to effectively cool the entire volume of deionized water, wherein the deionized water that is cooled by the heat exchanger descends in the above-mentioned cavity and the deionized water rises through the gap between the outer circumference of the electrolytic cell and the inner surface of the wall of the deionized water tank.

Moreover, as both the outer circumference side and the inner circumference side of the electrolytic cell are clamped and compressed, the rigidity of the electrolytic cell is improved relative to the conventional electrolytic cells.

What is claimed is:

1. An apparatus for producing hydrogen and oxygen having a deionized water tank containing an electrolytic cell therein, wherein a heat exchanger for cooling deionized water in the deionized water tank is operatively connected to, and positioned outside of, the deionized water tank, wherein an inlet to the heat exchanger is connected to an outlet of the deionized water tank, said tank outlet being adapted for location below a level of deionized water in an upper portion of the deionized water tank, and wherein an outlet from the heat exchanger is connected to an inlet of the deionized water tank, said tank inlet being below the tank outlet in a lower portion of the deionized water tank, said tank outlet guiding out deionized water at the upper portion of the deionized water tank into the heat exchanger, and said tank inlet supplying cooled deionized water from the heat exchanger into the lower portion of the deionized water tank.

2. The apparatus of claim 1 further comprising a cover on the deionized water flow outlet on the interior of the deionized water tank to prevent oxygen gas from flowing into the deionized water flow outlet.

3. The apparatus of claim 1 wherein the tank inlet is adapted below the electrolytic cell for supplying cooled deionized water beneath the electrolytic cell.

4. An apparatus for producing hydrogen and oxygen having a deionized water tank containing an electrolytic cell therein, wherein a heat exchanger for cooling deionized water in the deionized water tank is operatively connected to, and positioned outside of, the deionized water tank, wherein an inlet to the heat exchanger is connected to an outlet of the deionized water tank, said tank outlet being adapted for location below a level of deionized water in an upper portion of the deionized water tank, said tank outlet guiding out deionized water at the upper portion of the deionized water tank into the heat exchanger, and an outlet from the heat exchanger is operatively connected to the electrolytic cell in the deionized water tank to feed deionized water to the electrolytic cell.

5. The apparatus of claim 4 further comprising a cover on the deionized water flow outlet on the interior of the deionized water tank to prevent oxygen gas from flowing into the deionized water flow outlet.

6. An apparatus for producing hydrogen and oxygen comprising:

an electrolytic cell having an anode chamber and a cathode chamber, said chambers separated by an electrolyte membrane and located between electrode plates, and a deionized water tank containing said electrolytic cell therein, wherein the anode chamber and the cathode chamber each are formed as annular compartments being sealed on their inner circumferences and on their outer circumferences, such that the electrolytic cell is cylindrical having a cavity at the center thereof, and wherein a heat exchanger for cooling is deionized water in the deionized water tank is positioned in the central cavity of the electrolytic cell.

7. The apparatus of claim 6 wherein said cylindrical electrolytic cell comprises ring-shaped end plates at each end thereof, and a plurality of clamping means located outside the anode chamber and the cathode chamber on both the inner circumference side and the outer circumference side thereof, wherein the components of the anode chamber and the cathode chamber are clamped between the end plates by the clamping means.

8. The apparatus of claim 6 wherein said cylindrical electrolytic cell comprises a ring-shaped electrolyte membrane, ring-shaped porous conductors provided on each side of the membrane, ring-shaped electrode plates provided on the outer sides of each of the porous conductors, an outer side closing member provided on the outer circumference side of each porous conductor, and an inner side closing member provided on the inner circumference side of the porous conductors.

9. The apparatus of claim 6 comprising a plurality of said cylindrical electrolytic cells stacked together.

10. The apparatus of claim 6 wherein a path for discharging generated oxygen gas is formed to connect the anode chambers and a port of a discharging of oxygen gas on the outer circumference side of the cylindrical electrolytic cell.

11. The apparatus of claim 6 wherein the central axis of the central cavity of the cylindrical electrolytic cell is arranged to align with the central axis of the deionized water tank.

12. The apparatus of claim 6 wherein the deionized water tank comprises a tank shell and a tank cover, wherein the cylindrical electrolytic cell is disconnectably mounted on the inner side of the tank cover, and the cylindrical electrolytic cell is arranged such that when the tank cover is fit on the tank shell, the cylindrical electrolytic cell is positioned inside the tank shell.

13. The apparatus of claim 6 wherein the deionized water tank comprises a tank shell and a tank cover, wherein the heat exchanger is disconnectably mounted on the inner side of the tank cover, and the heat exchanger is positioned such that when the tank cover is fit on the tank shell, the heat exchanger is positioned inside the tank shell.

* * * * *